(12) United States Patent
Winkelman (10) Patent No.: US 10,219,626 B2
(45) Date of Patent: Mar. 5, 2019

(54) COMFORT PAD

(71) Applicant: Patrick John Winkelman, Ozona, FL (US)

(72) Inventor: Patrick John Winkelman, Ozona, FL (US)

(73) Assignee: Patrick John Winkelman, Palm Harbor, FL (US)

( * ) Notice: Subject to any disclaimer, the term of this patent is extended or adjusted under 35 U.S.C. 154(b) by 262 days.

(21) Appl. No.: 14/974,017

(22) Filed: Dec. 18, 2015

(65) Prior Publication Data

US 2016/0100690 A1    Apr. 14, 2016

Related U.S. Application Data

(63) Continuation of application No. 14/066,337, filed on Oct. 29, 2013, now abandoned.

(51) Int. Cl.
| | |
|---|---|
| *A47C 7/02* | (2006.01) |
| *B68G 5/02* | (2006.01) |
| *B60N 2/70* | (2006.01) |
| *A47C 7/54* | (2006.01) |
| *B60N 2/72* | (2006.01) |
| *B60N 2/75* | (2018.01) |

(52) U.S. Cl.
CPC .............. *A47C 7/021* (2013.01); *A47C 7/546* (2013.01); *B60N 2/7005* (2013.01); *B60N 2/72* (2013.01); *B60N 2/787* (2018.02); *B68G 5/02* (2013.01)

(58) Field of Classification Search
CPC ......... A43B 7/144; A43B 17/18; A47C 7/546; B60N 2/4673; B32B 2307/744; B32B 2475/00

USPC .................................................... 297/228.13
See application file for complete search history.

(56) References Cited

U.S. PATENT DOCUMENTS

| | | | | |
|---|---|---|---|---|
| 2,789,862 | A | * | 4/1957 | Boyer ................. B60N 2/4666 24/67 AR |
| 2,877,049 | A | | 3/1959 | Lucas |
| 4,147,828 | A | * | 4/1979 | Heckel ..................... A63B 6/00 442/30 |
| 5,010,996 | A | | 4/1991 | Washburn |
| 5,203,793 | A | * | 4/1993 | Lyden .................. A43B 3/0063 12/142 N |
| 5,332,288 | A | | 7/1994 | Coates |
| 5,605,374 | A | | 2/1997 | Perry |
| 5,692,711 | A | | 12/1997 | Tucker |
| 5,722,713 | A | | 3/1998 | Santa Cruz |
| 6,159,574 | A | * | 12/2000 | Landvik .................. A47C 27/15 428/213 |
| 6,241,695 | B1 | * | 6/2001 | Dabir ..................... A61H 7/001 601/134 |
| 6,506,271 | B1 | | 1/2003 | Yates |
| 6,578,914 | B2 | | 6/2003 | Artsvelyan |

(Continued)

*Primary Examiner* — Sarah B McPartlin (57) ABSTRACT

A comfort pad having a visco-elastic body encased in a film and fabric adapted to transfer the long term energy distribution properties of the visco-elastic body to the user is provided. A bottom surface of the visco-elastic body may provide frictional resistance so that neither film nor fabric is required, yet the comfort pad may removably secure to a harder structure, providing comfort to the user at this pressure point. The present invention may include an attachment assembly for mechanically and removably attaching the comfort pad between the harder structure and the user.

9 Claims, 7 Drawing Sheets

(56) References Cited

U.S. PATENT DOCUMENTS

| | | |
|---|---|---|
| 6,694,553 B1 | 2/2004 | Yates |
| 6,827,405 B1 | 12/2004 | Roberts |
| 6,840,566 B2 | 1/2005 | Bruton |
| 6,921,502 B1 * | 7/2005 | Nord .................. A47L 23/24 264/257 |
| 6,981,735 B1 | 1/2006 | Stephens |
| 7,086,108 B1 * | 8/2006 | Litvak .................. A47C 21/046 5/200.1 |
| 7,254,852 B2 * | 8/2007 | Martin .................. A47G 9/10 5/636 |
| 7,431,396 B1 | 10/2008 | Dasso |
| 9,915,512 B1 * | 3/2018 | Roach .................. F42C 99/00 |
| 2004/0209062 A1 | 10/2004 | Sebag |
| 2005/0084667 A1 | 4/2005 | Landvik |
| 2005/0224000 A1 * | 10/2005 | Holte .................. A61F 5/01 119/28.5 |
| 2007/0271705 A1 | 11/2007 | Woolfson |
| 2008/0060229 A1 | 3/2008 | Epstein |
| 2011/0133537 A1 * | 6/2011 | Salee .................. A47C 7/546 297/411.23 |
| 2013/0341979 A1 | 12/2013 | Girard |
| 2014/0109438 A1 | 4/2014 | Hoogerbrugge |
| 2014/0352072 A1 * | 12/2014 | Holladay .................. A61G 13/126 5/655.5 |

* cited by examiner

COMFORT PAD

CROSS-REFERENCE TO RELATED APPLICATION

This application claims the benefit of priority of U.S. non-provisional application Ser. No. 14/066,337, filed 29 Oct. 2013, the contents of which are herein incorporated by reference.

BACKGROUND OF THE INVENTION

The present invention relates to cushions and, more particularly, to a personal comfort pad providing relief to discomfort through adaptability and long term distribution of energy.

Much of physical human discomfort is the result of pressure points caused by the human body's prolonged contact with a harder surface, typically occurring when in a seated position, such as but not limited in an office chair, vehicle seat or the like. When portions of the body such as elbows, forearms, wrist, knees, ankles or legs come in regular with a harder support surface, uncomfortable pressure points develop that if continued could produce a host of underlying medical conditions.

Technologies addressing the needs to relieve such pressure points have been available from the beginning of time when humans first placed leaves or animal fur on the rock to disburse the pressure energy into their body. These technologies have evolved over time but for the most part have focused on durability rather than comfort. Moreover, such conventional cushioning devices have built in limitations as they are specifically designed for a specific or certain application, such as an arm rest. Such cushioning devices have been made to modify or adapt specific existing structures, but have limited usefulness due to the extreme variations in the total types of structures that can result in pressure points. This combined with the limiting energy dispersing capabilities and rapid degradation of current cushioning devices' materials, have produced a less than satisfactory performance in delivering personal comfort.

Furthermore, current cushioning devices include at least one or more of the following disadvantages. Due to the many different types of seating arrangements and pressure points specific to the body type, as well as individual seating preferences and material types of the surfaces, current cushioning devices do not have adequate adjustability so as to allow the user to place the cushioning device in a position specific to their unique situation and preferences. An additional disadvantage of the current cushioning devices is lack of ergonomic qualities of the material used to provide for the continuous comfort of the user. Yet another disadvantage is that most current cushioning devices are limited to either a mechanical attachment or adhesive attachment but not both, limiting the variability of applications.

As can be seen, there is a need for a personal comfort pad providing relief to discomfort through adaptability and long term distribution of energy.

SUMMARY OF THE INVENTION

In one aspect of the present invention, a comfort pad includes a visco-elastic body formed from a visco-elastic substance having long term energy distribution properties, wherein the visco-elastic body provides a top surface and an opposing bottom surface interconnected by a peripheral edge; and a fabric adapted to transfer the long term energy distribution properties, wherein the fabric covers at least the top surface and the peripheral edge.

In another aspect of the present invention, the visco-elastic body further includes a top layer providing the top surface; and a bottom layer providing the bottom surface, wherein the bottom layer has a higher viscosity than the top layer.

In yet another aspect of the present invention, a polymer film encases at least the top surface and the peripheral edge of the visco-elastic body or, alternatively, wherein the polymer film extends to encase the bottom surface, and wherein the polymer film provides a plurality of apertures as it extends along the bottom surface.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a comfort pad having a visco-elastic body encased in a film and fabric adapted to transfer the long term energy distribution properties of the visco-elastic body to the user. A bottom surface of the visco-elastic body may provide frictional resistance so that neither film nor fabric is required, yet the comfort pad may removably secure to a harder structure, providing comfort to the user at this pressure point. The present invention may include an attachment assembly for mechanically and removably attaching the comfort pad between the harder structure and the user.

Referring to FIGS. 1 through 11, the present invention may include a comfort pad 12 having a visco-elastic body 1 and a flexible fabric 3 adapted to transfer the visco-elastic properties of the visco-elastic body 1. The visco-elastic body 1 may be formed from any suitable visco-elastic substance exhibiting both viscous and elastic characteristics when undergoing deformation so as to have long term energy distribution properties. Purely elastic materials do not dissipate energy (heat) when a load is applied, then removed. However, the suitable visco-elastic substance loses energy when a load is applied, then removed. Since the visco-elastic substance exhibits viscous characteristics, the visco-elastic substance will lose energy through a loading cycle, such as deformation caused by pressure points. The visco-elastic substance may be a foam or polymer of various densities, shear properties, elongations, shapes, and thicknesses.

The visco-elastic body 1 may have a top surface 32 and a bottom surface 11 interconnected by a peripheral edge 34. The visco-elastic body 1 may be any geometric or non-geometric shape so long as the visco-elastic body 1 functions in accordance with the present invention as described herein. The top surface 32 may provide a plurality of contours 8 adapted to aid in comfort. The contours 8 may be protrusions adapted to more evenly distribute the energy and thus providing continuous comfort to a user sandwiching the comfort pad 12 between themselves and a pressure point surface 19.

A polymer film 2 may encase the visco-elastic body 1, wherein the polymer film 2 is adapted to maintain the integrity of, prevent leakage from, and transfer the visco-elastic properties of the visco-elastic body 1. A portion of the polymer film 2 may provide a plurality of apertures 10 along the bottom surface 11 so that portions of the bottom surface 11 may protrude through the plurality of apertures 10. In an alternative embodiment, the polymer film 2 may encase the top surface 32 and the peripheral edge 34 but not the bottom surface 11, so that the bottom surface 11 is exposed. The visco-elastic properties may include frictional resistance, especially when loaded by the weight of the user at a pressure point. The frictional engagement may include a temporary adhesive characteristic. Thus the frictional resistance of the visco-elastic substance protruding through the plurality of apertures 11 or alternatively exposed may operatively engage a hard surface 19 of a pressure point during use so as to prevent slippage.

A flexible fabric 3 may be attached to the polymer film 2 and/or the visco-elastic body 1 so as to encase the top surface 32 and the peripheral edge 34 but not the bottom surface 11. The flexible fabric 3 may be adapted to transfer the visco-elastic properties of the visco-elastic body 1.

In certain embodiments, an adhesive film 4 may be disposed along at least a portion of the bottom surface 11, providing an outward-facing adhesive surface. A peel-away protective cover 5 may be disposed over the adhesive film 4/outward-facing adhesive surface.

Figure 1:
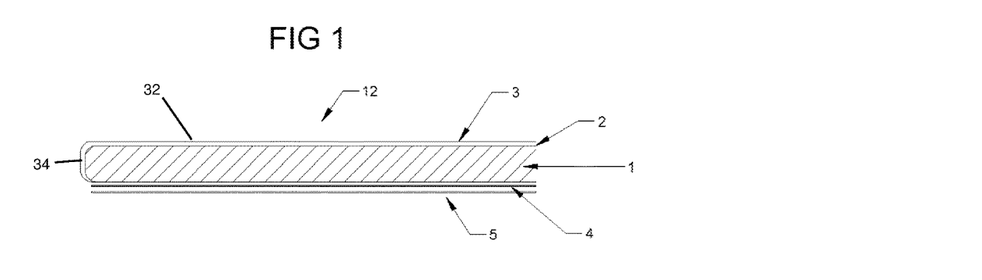
FIG. 1 is a cutaway view of an exemplary embodiment of the present invention, illustrating an embodiment with a film entirely encasing a visco-elastic body.
Figure 2:
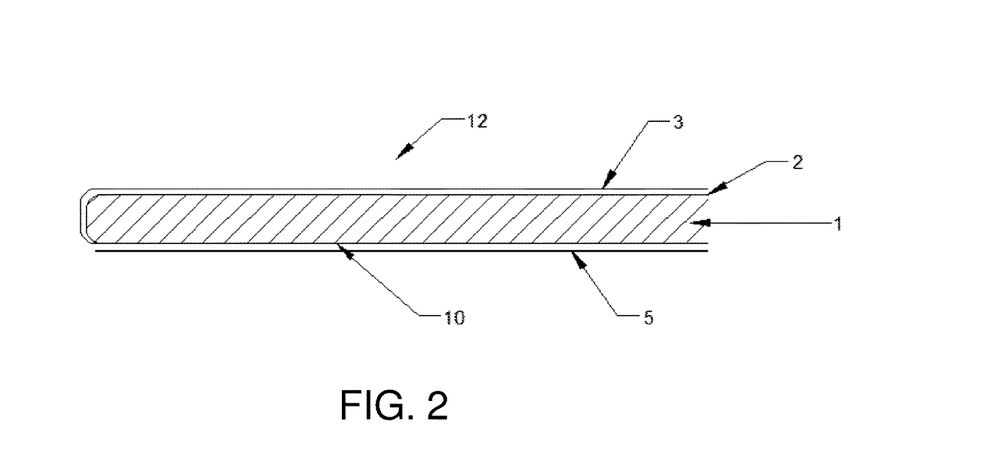
FIG. 2 is cutaway view of an exemplary embodiment of the present invention.
Figure 3:
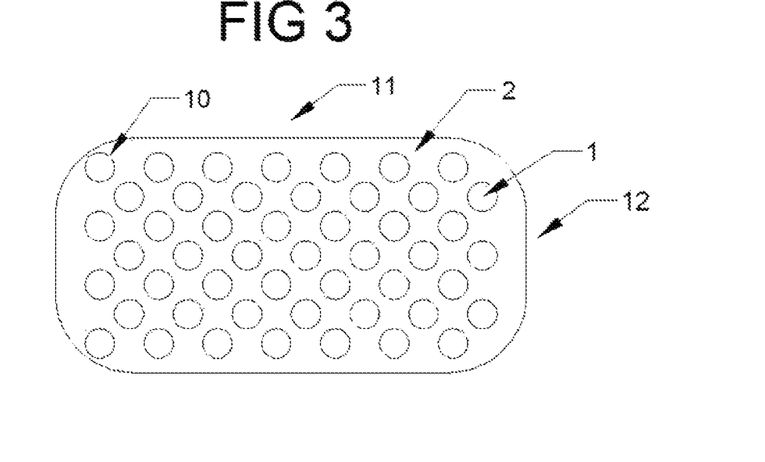
FIG. 3 is a bottom plan view of an exemplary embodiment of the present invention.
Figure 4:
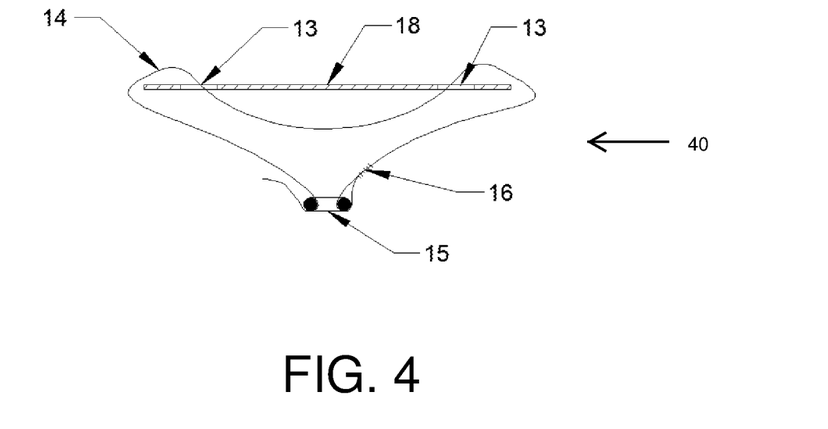
FIG. 4 is a front elevation view of an exemplary embodiment of the present invention, illustrating an attachment assembly.
Figure 5:
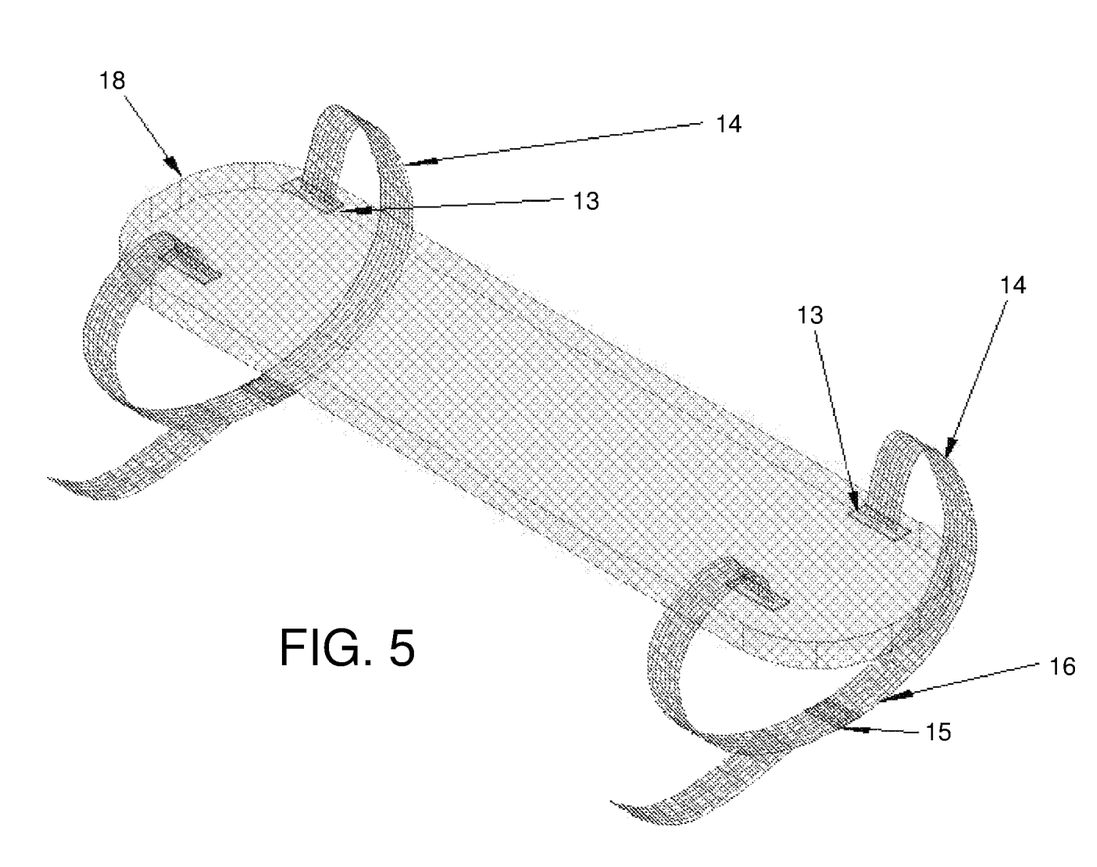
FIG. 5 is a perspective view of an exemplary embodiment of the present invention of the attachment assembly.
Figure 6:
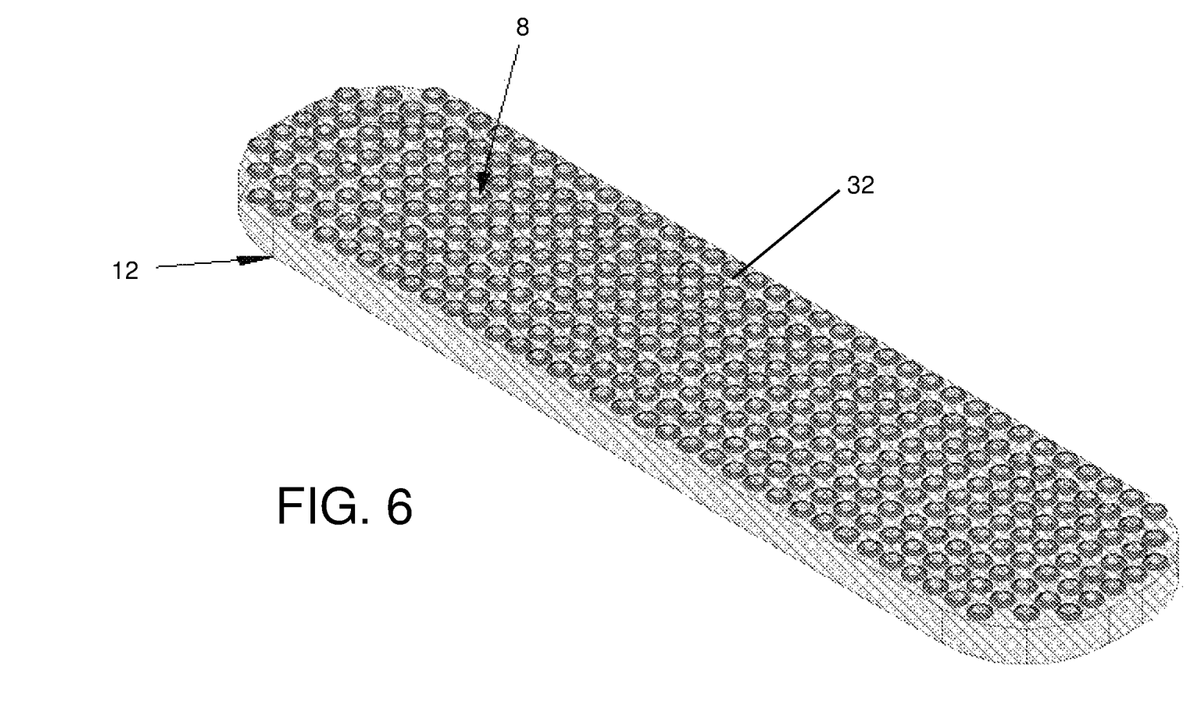
FIG. 6 is a top perspective view of an exemplary embodiment of the present invention.
Figure 7:
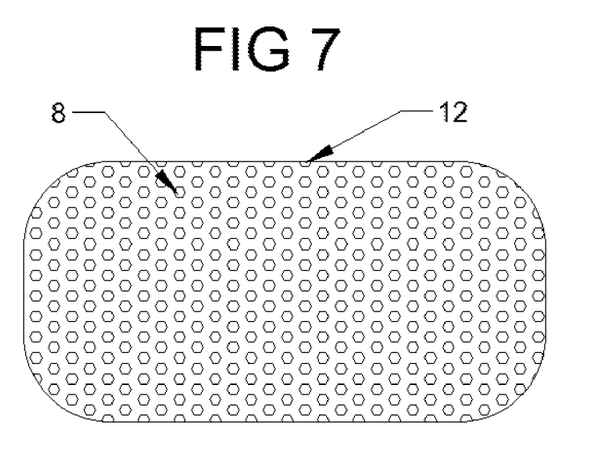
FIG. 7 is a top plan view of an exemplary embodiment of the present invention.
Figure 8:
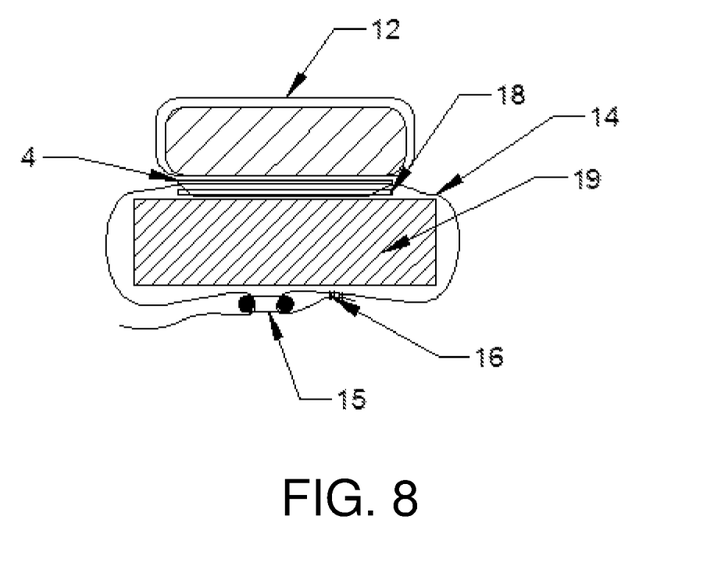
FIG. 8 is a section view of an exemplary embodiment of the present invention of the attachment assembly.
Figure 9:
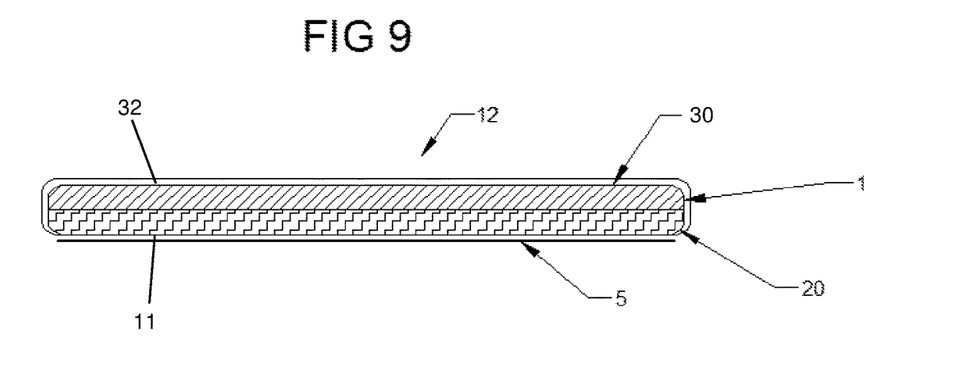
FIG. 9 is a section view of an exemplary alternative embodiment of the present invention.

In certain embodiments, the visco-elastic body 1 may include a bottom layer 20 providing the bottom surface 11 and a top layer 30 providing the top surface 32, as illustrated in FIG. 9. Each layer 20, 30 have visco-elastic properties, being formed from visco-elastic substances. The bottom layer 20 may be adapted to be harder than the top layer 30 so as to provide sufficient support and structural integrity for the comfort pad 12 as well as the necessary frictional resistance so as to obviate the need for the polymer film 2 or adhesive film 4. In other words, the visco-elastic substance of the bottom layer 20 may have a higher viscosity than the visco-elastic substance of the top layer 30. In certain embodiments, the ratio of the viscosity difference between the bottom layer 20 and the top layer 30 may be approximately 4 to 1. The layers 20 and 30 may be suitably joined.

Figure 10:
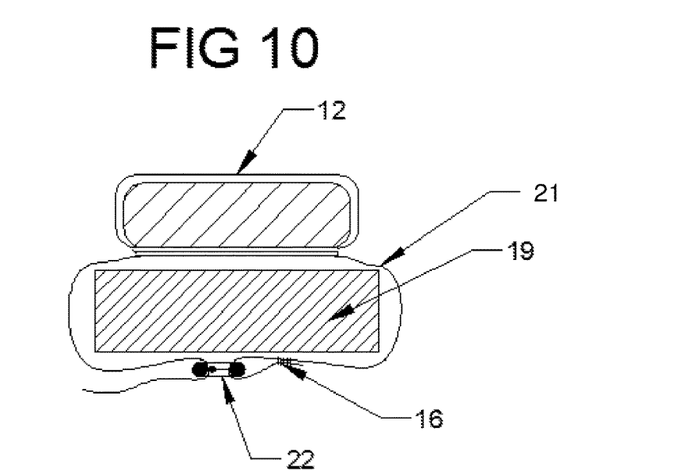
FIG. 10 is a section view of an exemplary embodiment of the present invention of the attachment assembly.

The present invention may provide an attachment assembly 40 for attaching the comfort pad 12 during use. The attachment assembly 40 may include a support plate 18 and at least one plate strap 14 having a locking mechanism 15. The support plate 18 may be sufficiently rigid, such as plastic, to provide sufficient support for the visco-elastic body 1. The support plate 18 may be used when the pressure point structure 19 has a surface that would diminish the effectiveness of the frictional resistance, such as fabric or leather surface. The adhesive bottom surface 11 would temporarily adhere to one side of the support plate 18, while the other side of the support plate 18 selectively engages the pressure point structure 19, as illustrated in FIG. 10.

The support plate 18 may provide at least one opening 13 anywhere on the support plate 18 where it is convenient to insert the plate straps 14. The support plate 18 may be coextensive with the bottom surface 11 so that they have similar length and width when viewed from the vantage point of FIG. 3. Thus the support plate 18 matches the adhesive footprint of the bottom surface 11.

Figure 11:
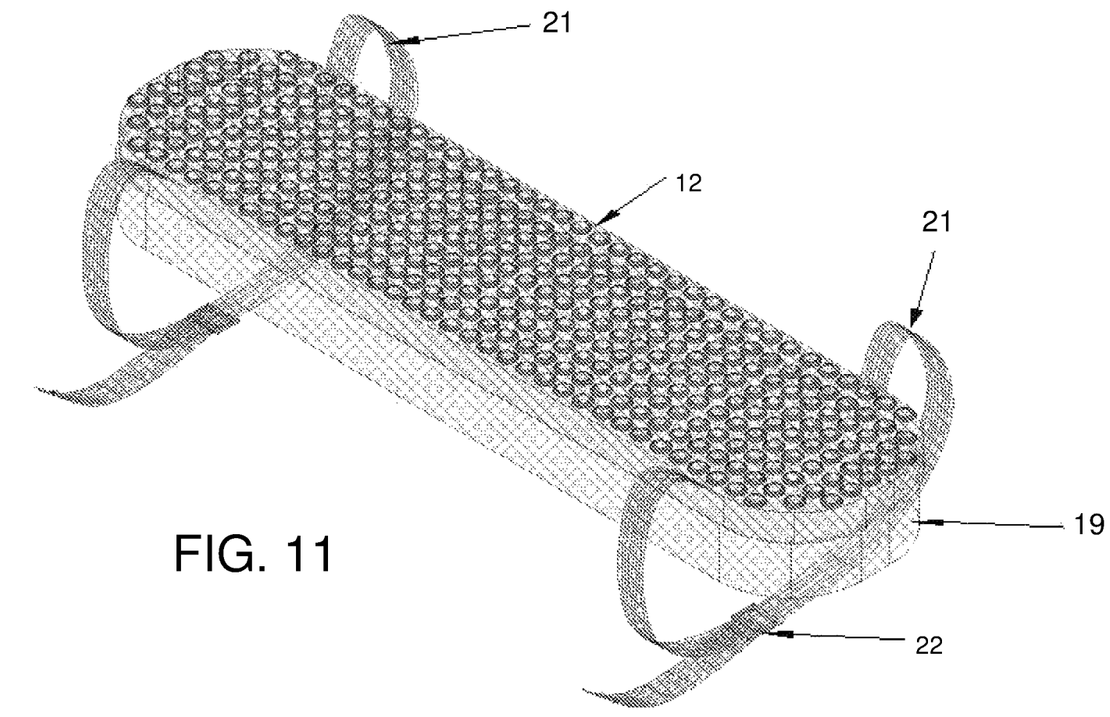
FIG. 11 is a top perspective view of an exemplary embodiment of the present invention.

The locking mechanism 15 may be a buckle 22, hook and loops fasteners, clamps, strings, or any suitable fastener known in the art for fastening or removably securing one object. In certain embodiments, the one strap 14 may have an attachment point 16 where it is attached to itself, for example by stitching. In certain embodiments, the plate straps 14 and support plate 18 may be replaced by body straps 21 where the body straps 21 are mechanically attached to the comfort pad 12 eliminating the need for support plate 18, as illustrated in FIG. 11. FIGS. 10 and 11 illustrate the comfort pad 12 having the body straps 21 integrated thereto and in use. The straps 14 or straps 21 can be made of any suitable materials such as cotton, or other synthetic material.

A method of using the present invention may include the following. The comfort pad 12 and the attachment assembly 40 may be provided. A user may attach the comfort pad 12 to the pressure point structure 19 in a desired, adjustable position; for example, by first fastening the two plate straps 14 and associated support plate 18 around the pressure point structure 19 and using the locking mechanism 15 to secure the comfort pad 12 thereto. Then the user may load the flexible fabric 3 with a body part so that the flexible fabric 3 and the polymer film 2 transfer the visco-elastic property of long term energy distribution, comforting that body part.

Alternatively the user may the comfort pad 12 with the two body straps 21 integrated directly into the comfort pad 12 where the two body straps 21 are fastened around the pressure point structure 19 and using the locking mechanism 15 to secure the comfort pad 12 thereto. Then the user may load the flexible fabric 3 with a body part so that the flexible fabric 3 and the polymer film 2 transfer the visco-elastic property of long term energy distribution, comforting that body part.

Alternatively, the user may just provide a comfort pad 12 where the bottom surface 11 and either the visco-elastic body 1 protruding through the plurality of apertures 10 or alternatively exposed frictionally engages the pressure point structure 19, wherein the user may continually adjust the disposition, placement and location of the comfort pad 12 to comfortably accommodate their body type and particular activity throughout a long term use.

It should be understood, of course, that the foregoing relates to exemplary embodiments of the invention and that modifications may be made without departing from the spirit and scope of the invention as set forth in the following claims.

What is claimed is:

1. A comfort pad comprising:
a body formed from a visco-elastic substance, wherein the body provides a top surface and an opposing bottom surface interconnected by a peripheral edge;
the body further comprises:
   a top layer providing the top surface; and
   a bottom layer providing the bottom surface, wherein the bottom layer has a higher viscosity than the top layer, wherein a ratio of the viscosity of the bottom layer to the top layer is approximately 4 to 1;
a polymer film encasing at least the bottom surface, the polymer film having a plurality of apertures distributed over substantially all of the bottom surface so that portions of the bottom surface protrude through the plurality of apertures in a loaded condition;
a plurality of contoured protrusions formed on the top surface; and
an attachment assembly comprising:
   a support plate coextensive with the bottom surface, wherein the support plate provides a plurality of openings;
   at least one strap operatively engaging at least one of the plurality of openings; and
   at least one locking mechanism attached to an end of the at least one body strap.

2. The comfort pad of claim 1, the polymer film further encasing at least the top surface.

3. The comfort pad of claim 1, wherein said portions frictionally resist slippage along an engaged surface when the comfort pad is in the loaded condition but not when said comfort pad is in an unloaded condition.

4. The comfort pad of claim 3, further comprising a plurality of contoured protrusions formed on the top surface.

5. The comfort pad of claim 4, further comprising an attachment assembly comprising:
   a support plate coextensive with the bottom surface, wherein the support plate provides a plurality of openings so that said portions of the bottom surface protrude through the plurality of openings in the loaded condition;
   at least one strap operatively engaging at least one of the plurality of openings; and
   at least one locking mechanism attached to an end of the at least one strap.

6. The comfort pad of claim 4, further comprising an adhesive film disposed over a portion of the bottom surface.

7. The comfort pad of claim 6, further comprising a peel-away protective cover disposed over the adhesive film.

8. The comfort pad of claim 4, further comprising two body straps integrated to the body.

9. The comfort pad of claim 1, further comprising two body straps integrated to the body.

* * * * *